(12) United States Patent
Wynne

(10) Patent No.: US 8,462,628 B2
(45) Date of Patent: Jun. 11, 2013

(54) METHOD OF IMPROVING OVER PROTOCOL-REQUIRED SCHEDULING TABLES WHILE MAINTAINING SAME

(75) Inventor: John M. Wynne, Sunnyvale, CA (US)

(73) Assignee: Integrated Device Technology, inc., San Jose, CA (US)

( * ) Notice: Subject to any disclaimer, the term of this patent is extended or adjusted under 35 U.S.C. 154(b) by 1396 days.

(21) Appl. No.: 11/643,465

(22) Filed: Dec. 20, 2006

(65) Prior Publication Data

US 2008/0151753 A1    Jun. 26, 2008

(51) Int. Cl.
*H04J 1/16* (2006.01)
(52) U.S. Cl.
USPC .......................................................... 370/235
(58) Field of Classification Search
USPC .......................................... 370/235, 229, 230
See application file for complete search history.

(56) References Cited

U.S. PATENT DOCUMENTS

| | | | | |
|---|---|---|---|---|
| 5,109,414 A | * | 4/1992 | Harvey et al. ................ | 725/135 |
| 5,608,879 A | * | 3/1997 | Cooke .......................... | 710/110 |
| 5,835,764 A | * | 11/1998 | Platt et al. .................... | 718/101 |
| 6,654,343 B1 | * | 11/2003 | Brandis et al. ............... | 370/229 |
| 6,735,601 B1 | * | 5/2004 | Subrahmanyam ............... | 1/1 |
| 7,046,626 B2 | * | 5/2006 | Davis et al. .................. | 370/230 |
| 7,155,716 B2 | * | 12/2006 | Hooman et al. ............. | 718/102 |
| 7,272,151 B2 | * | 9/2007 | Moll et al. ................... | 370/423 |
| 7,366,785 B2 | * | 4/2008 | Ishiyama et al. ............. | 709/229 |
| 2003/0028671 A1 | * | 2/2003 | Mehta et al. ................. | 709/245 |
| 2004/0015599 A1 | * | 1/2004 | Trinh et al. .................. | 709/232 |
| 2004/0162807 A1 | * | 8/2004 | Montagne ....................... | 707/1 |
| 2006/0101178 A1 | * | 5/2006 | Zhong et al. ................. | 710/112 |

* cited by examiner

*Primary Examiner* — Mark Rinehart
*Assistant Examiner* — Mohammad Anwar
(74) *Attorney, Agent, or Firm* — Tracy Parris

(57) ABSTRACT

Public scheduling tables of PCI-Express network devices are remapped into private scheduling tables having different data structures. The private scheduling tables enable the construction of parallel-processing selection engines (ones with look-ahead selection capabilities) that are more compact in size than would have been possible with use of the data structures of the public scheduling tables. In one embodiment, residual weight values are re-shuffled so as to move each winner of an arbitration round away from a winner's proximity bar by a distance corresponding to an initial weight assigned to the winner. The initial weight can be proportional to the reciprocal of a bandwidth allocation assigned to each data source.

42 Claims, 6 Drawing Sheets

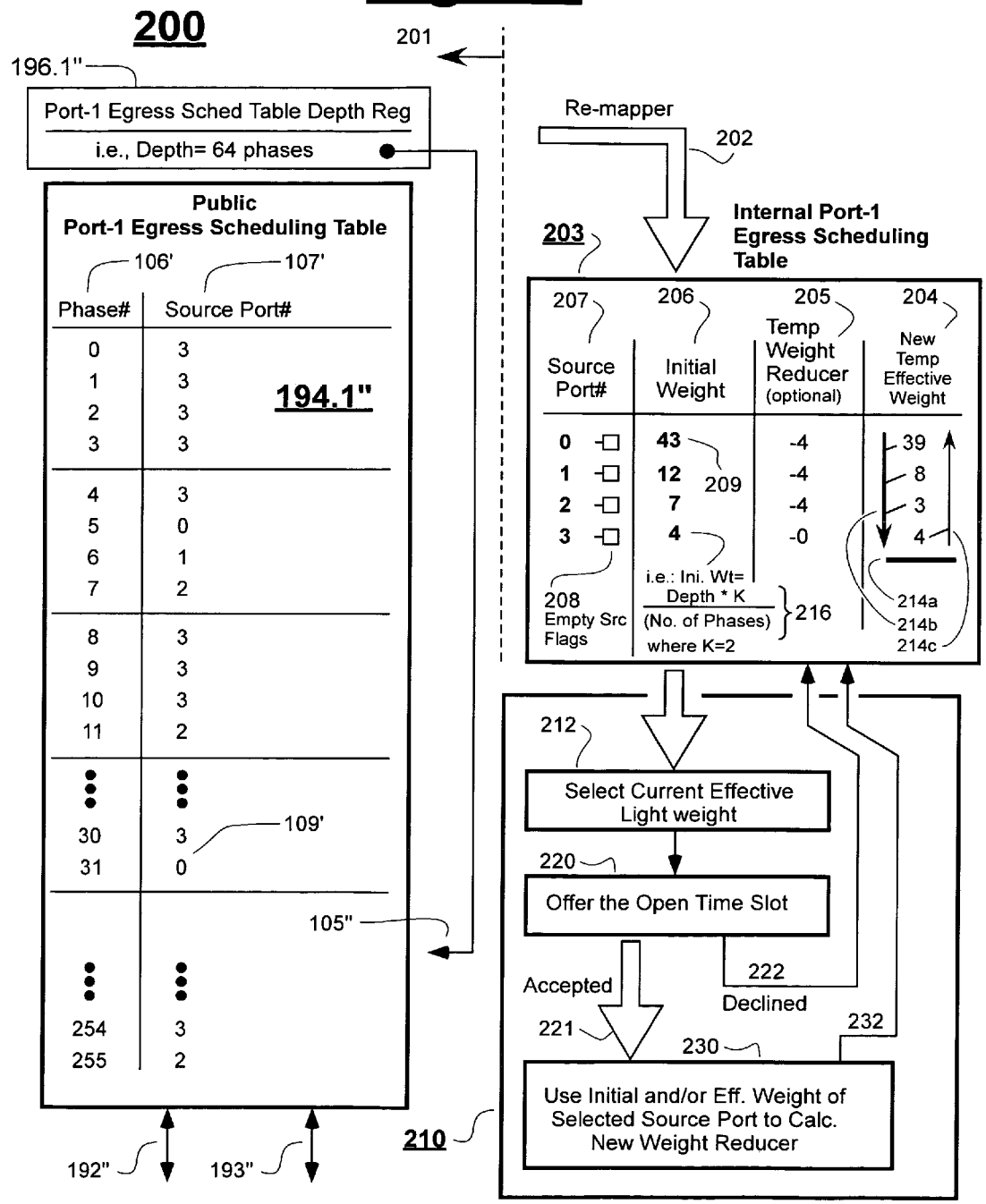

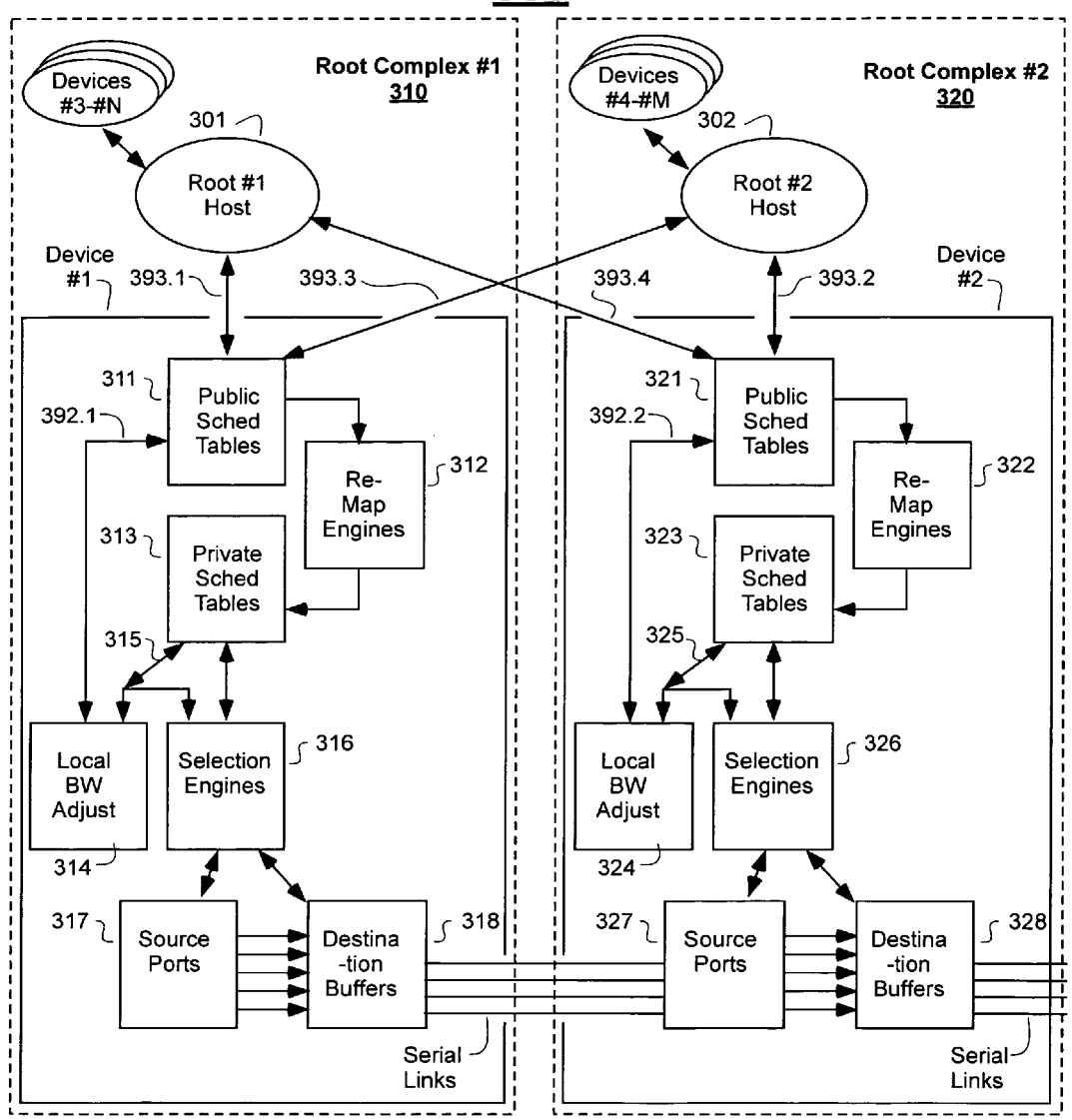

METHOD OF IMPROVING OVER PROTOCOL-REQUIRED SCHEDULING TABLES WHILE MAINTAINING SAME

FIELD OF DISCLOSURE

The present disclosure of invention relates generally to data processing systems in which competing data streams vie for access to a data-servicing resource of limited bandwidth, wherein selection among the streams is specified as being driven by a scheduling table having a relatively fixed, first data structure, and where that first data structure can impose undesirable restrictions on the way that high speed selection circuits are constructed. The disclosure relates more specifically to network systems that transmit streams of information in packet format through a shared port or another resource of limited bandwidth on a schedule-driven basis. The disclosure relates even more specifically to systems that use protocol-specified scheduling tables to manage scheduled use of shared network resources.

DESCRIPTION OF RELATED ART

Use of digitally-encoded packets in data communication networks is well known. Typically each packet is layered like an onion to have a header-type outer shell section, a payload and/or message core section and one or more error correction sections that cover various parts of the core or outer shells. Packets may be transmitted individually or as parts of relatively continuous streams or bursts of packets depending on quality of service requirements (QOS) and/or availability of bandwidth on transmission links and/or availability of buffer space. Congestion can be a problem. Underutilization of resources can be a problem. Flexible scheduling and re-scheduling of resource utilization is often relied upon to balance traffic flows within a complex and dynamically changing network environment. Re-scheduling may be based on back-pressure flags or on slack advisement signals as shall be further detailed below.

When a packet signal is transmitted from a given source device to a selected one or more receiving devices, the packet signal typically travels through a shared traffic-conveying resource (e.g., through a serial link) so as to arrive thereafter at each receiving device and progress through a series of packet-unraveling layers in that receiving device. The typical progression is that of first passing through a physical interface layer (PL), and then through one or both of a data link layer (DL) and a transaction layer (TL). The physical interface layer (PL) may include means for deserializing serialized data in the packet (a SERDES function) and means for recognizing the start and end of each ingressing packet and synchronizing it to a local device clock. The data link layer (DL) may include means for managing error checking, error correction (e.g., ECC, CRC) and/or managing packet ordering and verifying completion of sequences of interrelated packets. The transaction layer (TL) may include means for parsing (peeling the onion skin layers of) different parts of each kind of post-DL packet so as to get to desired portions of payload data or message data held in the packet where the extracted data is then forwarded for respective processing by an appropriate processing means within the device. Specific processing of TL output data may be carried out by a so-called, File Data Processing Layer. After it is processed by the File Data Processing Layer or by other such means, the post-process payload and/or message data may need to be output to a designated one or more next destinations on the network via respective linking ports. The numbers of available ports and/or their bandwidths are generally limited in nature and therefore use of these limited resources is shared on a multiplexed and often on a pre-scheduled basis.

Typically packets are scheduled for ordered output (for egress) according to pre-established priority schemes and/or bandwidth allocation schemes. Flexibility in schedule management is often desirable because the intended destination device or devices (depending on whether the data egress is of a unicast or multicast type) can become intermittently congested or backed up with already received data at the moment and thus not ready for receiving additional data. Alternatively or additionally, on occasion certain types of egressing packets may need to be granted wider bandwidths through a shared resource (e.g., a shared egress port) at the expense of other types even if the other types of packets have been waiting in queue longer. Bandwidth allocations may have to be dynamically modified if packets streams destined for an underutilized destination device (one having slack space in its ingress buffers) need to be advanced out of their respective queues at faster paces than used before so as to keep all in-network devices efficiently full and busy.

So in short, intelligent and flexible scheduling is desirable. To this end, some network protocols call for the use of dynamically-reprogrammable scheduling tables having protocol-specified data structures. These tables may be used for managing the scheduling of egressing packet streams out through respective ones of shared ports in real time and/or for managing the ingress of packets in through respective ports. Dynamic-rescheduling is desirable because conditions on the network can fluctuate over time and scheduling strategies may need to be adaptively altered in real time to thereby cope with ever-changing network conditions (for example to conditions where some egress destinations suddenly become swamped with too much incoming data while others come close to being fully depleted and thus starved for more data that is needed on an as soon as possible basis due to QOS requirements).

One industry standardized networking protocol that allows for flexible resource allocation is known as PCI-Express™. Within the PCI-Express standard specification (http://www.pcisig.com/specifications/pciexpress/base) there is a section numbered 7.11.19 which defines a data structure for, and operational timings of, scheduling tables that are to be used for managing the egress of packets through the plural ports of each PCI-Express routing device. Such tables may have to be accessed by different devices within the network and thus they may have to be kept publicly available to network management inquiries and/or to modification requests made by appropriate supervisory entities. As a result of their relatively public accessibility, it is generally necessary from a software compatibility viewpoint for these scheduling tables to adhere to the protocol-set specifications regarding their data structures and their operational attributes.

Industry-mandated standards for scheduling tables may sometimes lead to unintended consequences and significant problems. Specific drawbacks of the PCI-Express base specification section number 7.11.19 are detailed below. Workarounds are also disclosed. Suffice it to say for now that full and direct implementation of the 7.11.19 specification impedes the constructing of a compact and high speed scheduling circuitry as well as one that is able to generally provide smoothed-out distribution of bandwidth allocation.

Once a current schedule is established for the traffic flow through a given network resource (e.g., multi-stream multi-plexed flow out of a given serial port in the egress direction), blocks of packet data are typically selected on a bandwidth weighted basis and in accordance with the schedule for transfer from respective source buffers and handing off to respective egress buffers so that the data will next automatically egress from a particular port and head towards a next destination device. The hand off or dispatch may occur in successive time slots granted along a dispatch path provided between a plurality of source units (e.g., source buffers) and a shared output port that links to a desired destination device. The egressing packet data typically progresses through the layers of the transmitting device in the reverse order to entry into the same device, namely, first by moving selectively dispatched payload data and/or embedded message data from file layer buffers (source buffers) to desired, shared buffers in the transaction layer (TL). Transaction control code is typically attached to the dispatched data as it resides temporarily in the shared buffers of the transaction layer. Then the TL-modified data moves through the data link layer (DL) for attachment thereto of sequence number codes and error check codes. Finally it moves through the sender's physical interface layer (PL) for encoding into a serial transmission format (by the SERDES function) and for output onto a physical transmission media (e.g., a high frequency cable or printed circuit strip or wireless transmission in some cases) that links them to the next destination device in the network.

This process may seem fairly simple from the bird's eye view just given of the system. Unfortunately it gets complex as one delves into the details of port reconfiguration and dynamic bandwidth allocation for virtual channels. Suffice it to say at this introductory stage that industry standards may specify a very unique way in which traffic scheduling is to be managed and that the ordinary practitioner generally adheres to the protocol specified way of doings things; even if such adherence is detrimental to system costs and/or system performance.

This disclosure provides an alternative way of doing things. The alternative way allows a practitioner to appear to be roughly adhering to the protocol specified way of managing traffic flow while in fact managing it differently and more efficiently.

SUMMARY

Structures and methods are provided in accordance with the present disclosure of invention for improving over the above-described shortcomings of certain types of protocol-dictated scheduling structures.

In accordance with the invention, and at a relatively broad level of description, a data processing device is provided for servicing a plurality of data streams with a limited processing resource (i.e., egress port) and on a time multiplexed basis where the device comprises: (a) a first scheduling table for storing first scheduling variables that define relative selection frequencies at which competing data streams will be selected and offered servicing by a shared data-servicing resource (e.g., by the transaction layer buffers of a serial link port), where the first scheduling table has a predefined, first data structure; (b) a second scheduling table for storing second scheduling variables that are derived from the first scheduling variables where the second scheduling table has a second data structure that is substantially different from the first data structure; and (c) a selection engine that is responsive to the second scheduling variables stored in the second scheduling table and that operates to offer service opportunities to plural data stream sources (e.g., to file-layer source buffers) in a manner which at least roughly mimics a service-offering schedule defined by the first scheduling variables of the first scheduling table. In one embodiment, the second data structure allows the selection engine to have a parallel processing architecture that is more compact than would be possible if the selection engine interacted directly with the predefined first data structure of the first scheduling table. In one embodiment, the device further comprises: (d) a re-mapping unit that repeatedly derives the second scheduling variables from the first scheduling variables in response to detection of changes made to the first scheduling table. In one embodiment, the first scheduling table is publicly accessible to plural in-network devices while the second scheduling table is relatively private and accessed primarily by the selection engine (c) and the re-mapping unit (d). To the outside world it appears that the selection engine is roughly complying with a schedule defined by the publicly accessible, first scheduling table.

At a relatively more specific level of description, a packet data selecting (dispatching) method is provided for use in a protocol compliant network device where the packet selecting method maintains a protocol-compliant, first scheduling table that is publicly accessible to external ones of allowed schedule managers or overseer devices while at the same time the method maintains a relatively private, second scheduling table that is derived from the public first table but has a substantially different data structure and where selections made by the selecting method are in response to the private, second scheduling table rather than in direct response to the more public, first scheduling table. To the outside world it appears that the method is generally complying with selection criteria held in the public and protocol-compliant first scheduling table, while internally, the method uses the re-mapped private version. The re-mapped private version allows hardware to be implemented on a more efficient, cost effective and flexible basis (i.e., by needing less memory space and a fewer number of condition-detecting logic circuits and allowing for a broader range of scheduling rules). In one embodiment that is directed to the PCI-Express™ environment, phase instances are remapped into per-port weight factors and a shuffled residual scheme is used for fairly distributing access opportunities to data arriving from different source ports or source buffers based on initial weights assigned to those source ports or source buffers.

In terms of yet more specific details, an apparatus in accordance with the disclosure may comprise: (a) a re-mapping means for remapping a publicly-maintained, first scheduling table that has a first data structure to thereby generate a corresponding and privately-maintained, second scheduling table that has a different second data structure; and (b) a history-weighted, service offering means for opportunistically offering dispatch opportunities (i.e., dispatch time slots) to traffic from different source streams based on initial weights assigned to the source streams and based on prior service offerings made to those source streams.

Other aspects of the disclosure will become apparent from the below detailed description.

BRIEF DESCRIPTION OF THE DRAWINGS

The below detailed description section makes reference to the accompanying drawings, in which:

FIG. 2A is a combined schematic and flow chart for illustrating how remapping and dispatch scheduling may be carried out in accordance with the present disclosure;

FIG. 3 is a block diagram showing a multi-root network system that is structured in accordance with the disclosure.

DETAILED DESCRIPTION

Figure 1A:
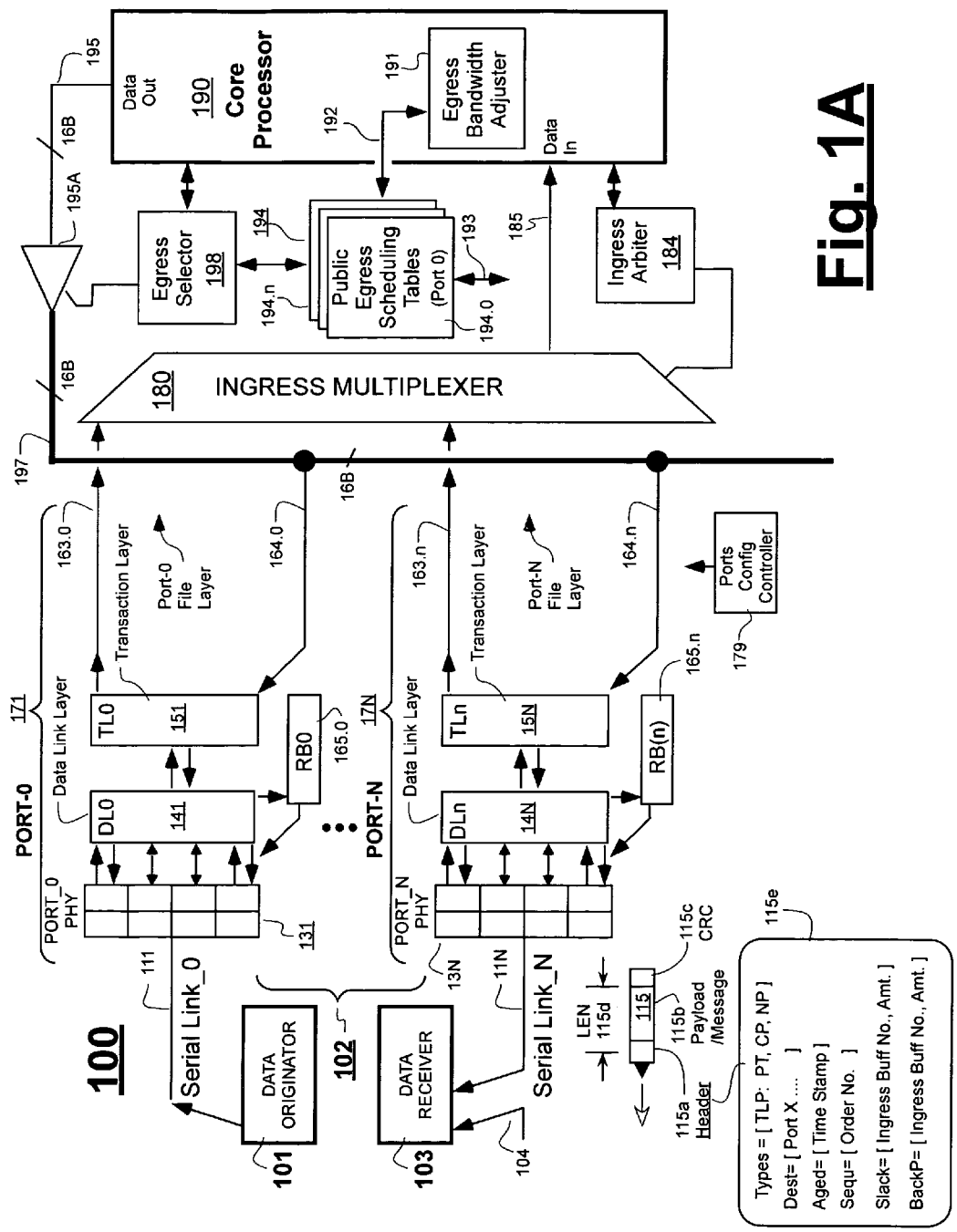
FIG. 1A is a block diagram showing a packet switching system having plural ports and a corresponding plurality of per-port egress scheduling tables that each publicly store a scheduling scheme that is to be used by the corresponding port in determining which of competing post-process packets are to be next offered a dispatch opportunity for egress via the respective egress link of the given port.

Referring to FIG. 1A, shown is a system 100 that uses a PCI-express™ serial interconnect network to interconnect a data originating, first device 101 (Originator) to a data receiving, third device 103 (Receiver, Destination) by way of a data routing and/or processing second and intermediate device 102.

Each of devices 101, 102 and 103 may be implemented as a monolithic integrated circuit (IC). The second device 102 is illustrated in greater detail than are the originator device 101 and the destination device 103. However, it is to be noted that devices 101 and 103 may be as complex of even more complex than the intermediate device 102.

It is also to be noted that the first device 101 need not be a single-ported packet sourcing device although it is shown as such in FIG. 1A. The first device 101 may alternatively have been shown as a multi-ported routing one that sends and receives data over a plurality of bidirectional ports in much the same way as does the more detailed, second device 102. In other words, the first device 101 may function as an intelligent router for multiple streams of variable-density traffic in ways similar to how the second device 102 is expected to function. The term, variable-density traffic is intended to imply here that traffic rates (i.e., packets per second) at the one or more of the ports of the first device 101 may surge and wane over time just as is the case for data traffic densities at each of the plural ports of the second device 102. The third device, 103 is shown to have at least two data receiving links (104 and 11N) for reasons that will become clearer below. As is the case with the first device, the third device 103 may alternatively have been shown as a multi-ported one that sends and receives data over a plurality of bidirectional ports in much the same way as does the more detailed, second device 102. Devices 101, 102 and 103 may reside within a set of multiple and interconnected root complexes such as 310 and 320 of FIG. 3. (Devices #1 and #2 of FIG. 3 are structured to include private scheduling tables 313, 323 whose purpose and structures will become easier to understand after first gaining appreciation of the so-called, public scheduling tables 194 shown in FIG. 1A.)

In the illustrative example provided by FIG. 1A, a multiplexed first serial physical link such as 111 couples the first device 101 (Data Originator) to a physical layer interface block 131 of the second device 102. (The schematically illustrated, serial link 111 is merely conceptual and may be implemented by use of plural serial links, i.e., plural twisted wire couplings, rather than just one link. It may include use of optical communication media as well as electrical media.) Multiple channels of data may be transmitted over the first multiplexed serial physical link 111 by use of one or more forms of signal multiplexing. Time domain multiplexing (TDM) may be used for example, on the physical serial link 111 for mixing together the data of a number of physical sub-channels or "lanes" of data as they are called under the PCI-Express™ standard so as to define an aggregated logical channel of data flowing into a corresponding logical "port" or PCI-Express logical "link" 171 formed in second device 102. As is understood by artisans skilled in PCI-Express technology, a physically-implemented aggregation of lanes may be followed by a logical bifurcation of bandwidth at each port so as to define plural virtual channels of respective bandwidths that are subdivided out of the aggregate bandwidth allocated to each aggregated port (allocated by virtue of the number of lanes assigned to that port).

It is assumed in the illustration that system configuration operations have created an aggregation of four lanes numbered 0-3 for PCI port 171, with each lane effectively constituting a one byte (1-B) wide parallel lane after SERDES operations are performed in the physical layer. The physical layer interface portion 131 (PHY) of port 171 (which port is also identified as PORT_0) receives the serially transmitted signals of multiplexed link 111 (e.g., a differential and optically encoded signal; i.e., 10 bits per character optical encoding) and converts the received, serial data into four parallel data flows of 8 bit encoded data that thereafter combine and flow into a respective Port-0 Data Link layer 141 in step with a corresponding lane synchronizing clock (clock not shown). After processing by the Data Link layer 141, and strip off of some data therein, the remaining packet bytes are next processed by the transaction layer 151 of that Port_0 (171) and the subsequently remaining packet bytes are thereafter processed by a core payload processor 190 (sometimes referred to as the File Data Layer Processor). In one embodiment, the core payload processor 190 provides port-to-port routing of payload data. Egressing payload data then passes out through a routing-defined, egress port_N (i.e., 17N) and through its respective TL, DL and PHY layers prior to continuing out on serial link 11N to the specified destination device 103.

Although a certain amount of attention is given here to describing details of the overall system 100, ultimately, the present disclosure will be focusing on the so-called, public scheduling tables 194 maintained within the system 100 and also on the management of packet data dispatching from buffers of the processing core 190 (source buffers) to buffers of the TL layer (destination buffers) in compliance with scheduling data held within the public scheduling tables 194. It is to be noted that the details given here regarding the specific architecture surrounding the public scheduling tables 194 are for the most part unimportant. A wide variety of different architectures may be used for implementing PCI-Express compliant or other networking devices. For example, in an alternate embodiment, dispatch of egressing packet data from the core layer (190) to the TL buffers (151-15N) of different ports is handled by a shared memory fabric rather than by the tristate distribution bus 197 that is illustrated in FIG. 1A. The tristate bus based architecture provides an easier way to explain and show the dispatch and distribution operations and thus provides readers with an easier way to quickly grasp the nature of the environment in which the inventive concept operates. Although PCI-Express is used as an example here, similar scheduling tables like 194 may be employed in other data dispatching systems and similar techniques for responding to the schedule data that is recorded in such tables may therefore be employed in such other data dispatching systems where practical. Thus the invention is not limited to PCI-Express™ (version 1.0) alone or to the exemplary port-to-core architecture shown in FIG. 1A but rather may be practiced in a variety of different environments that call for public scheduling tables having predefined data structures and that call for dispatch of data in accordance with scheduling variables stored in the public scheduling tables.

Before continuing with further details of the architecture 100 shown in FIG. 1A, some further background information on PCI-Express may be in order at this point, particularly as it applies to port management and balancing of traffic flows within a network. The more standard, PCI bus is a well known form of standardized signal interchange within the field of digital computer and communication system design. One lesser known extension of the PCI bus standard is referred to as PCI-X. An even newer and emerging extension of these is referred to as PCI-Express. The three should not be confused with one another. While the present disclosure focuses on a first generation of the PCI-Express protocol, design of a second generation, PCI-Express 2.0 protocol is in development and it is expected that the present disclosure will also be applicable to PCI-Express 2.0 as well as later generations.

PCI-Express 1.0 may be characterized by its use of high speed serial links and of packets structured to move through such high speed serial links. Like other communication standards, the PCI-Express protocol defines a layered packet-handling architecture that includes (1) a Physical signaling layer, (2) a Data link layer and (3) a Transaction layer. The Physical signaling layer of PCI-Express is typically characterized by use of a Low-Voltage Differential Signaling (LVDS) high-speed serial interface specified for 2.5 GHz or higher signaling per lane, while further using 8B/10B or like link encoding and using AC-coupled differential signaling. A complementary set of LVDS pairs is sometimes referred to as a physical link. The PCI-Express standard allows for re-configurable lane combinations within each port so as to thereby form different numbers of wider (faster) or narrower (slower) communication ports designated as x1, x2, x4 and so on up to x32; where the x1 configuration of a given port is the slowest (narrowest) and the x32 configuration is the fastest (widest bandwidth). Multi-lane links can provide for higher bandwidth communication capabilities than can a comparable single-width link that has long dead times. Bandwidth per port can be dynamically re-allocated within a PCI-Express system to thereby cope with changing environmental needs. (This is one reason why scheduling tables may be reconfigured from time to time. A more common reason is because of changing back-pressure or slack conditions within the given network.)

The Data link layer of the PCI-Express protocol is typically characterized by packet exchange standards that govern how packets route between neighboring PCI-Express entities and over its single or multi-lane highways while assuring data integrity and providing for sequence checking, along with packet acknowledgments and flow control. The Transaction layer of the PCI-Express protocol is typically characterized by standardized rules for translating data read and/or write requests as they move through switching nodes between an intelligent host and one or more endpoint devices. Design of the File Data processing core (190) is left to the end user's discretion.

There is much to the PCI-Express standard that is beyond the scope of the present disclosure. More information about the standard may be obtained via the internet from the PCI Special Interest Group at: http://www.pcisig.com/specifications. From a big picture viewpoint, the PCI-Express layers (PHY, DL, TL) are given the responsibility of automatically packaging file data into packets, making sure that egressing packets get to where they are supposed to (and if not reporting the transmission error), of unraveling ingressing packets and of handing off the unraveled and error-checked file data to the processing core. In this way the processing core (190) is alleviated of most of the headaches involved with data transmission over serial links. However one of the headaches that the core still needs to deal with is that of managing the dispatch of core data (195) from the core to the TL layer (151-15N) so that the PCI-Express layers (PHY, DL, TL) can thereafter take over and package the core data into packets.

Returning again to the specifics of FIG. 1A; in the egress side of this example, TL processed data words (e.g., bytes) may be temporarily stored in respective file data storage units or data stacks (not shown) within the core processor 190 depending on how much slack space is available in those ingress-side buffers. In one embodiment, ingress-directed data (163.0-163.n) from the transaction layer sections 151-15N feeds into an ingress multiplexer 180. An ingress arbiter 184 determines when and which data will flow into available buffer space within the core processor 190. (Arbiter 184 may be responsive to public scheduling tables, but for sake of simplicity we focus on egress side scheduling.) After processing in the core processing unit 190, post-process data moves out over a 16-Byte wide tristate bus 197 (in the illustrated embodiment) and selectively latches into respective egress capture registers at receiving ends of the TL units 151-15N. This may be referred to as a dispatch operation in that the core processor 190 hands off responsibility for the to-be-packaged-in-packets data to the TL units. A small 4-bit or wider bus (not shown) carries a port code which determines which of up to 16 ports (in this embodiment) will currently latch the post-process data currently being dispatched and distributed via the tristate bus 197. This particular embodiment allows for reconfiguration of the port structure to allow for a maximum of 16 one-lane ports or two by-8 ports or other aggregations of lane resources between these extremes (e.g., four by-2 ports). In other embodiments, dispatch bus 197 may be wider or narrower depending on port aggregation limitations. Egressing post-process data moves from its respective transaction layer unit (151-15N) to the corresponding data link layer unit (141-14N); after which the data is passed into the physical layer unit 131-13N for serialization and output via a respective destination link as the illustrated 11N. At the same time that the DL block (e.g., 14N) attaches its data-link control bytes to the passing through packets of information and as it forwards the so re-packaged packet data to the physical layer (e.g., 13N), it also sends the re-packaged packet data to a corresponding retry buffer (e.g., RB(N) 165.n) for temporary storage therein in as a re-sendable copy of the egressing packet. If a resend request is received (e.g., a negative acknowledge from the link partner 103), the corresponding re-sendable copy in the retry buffer may be used to resend the requested packet. The re-sendable copy is fetched from the retry buffer and passed into the physical layer (e.g., 13N) for repeated transmission to the device (e.g., link partner 103) that made the resend request (or failed to provide a timely acknowledgement of receipt). The core processor 190 is freed of the responsibility of handling such mundane traffic issues.

However, as already mentioned there is another, higher level of responsibility for handling traffic issues which is typically assigned at least to the core processor 190 and that is the scheduling of dispatches of data blocks from the core layer (from source buffers, not explicitly shown) to the TL units. Aside from retry management, another important type of messaging that often gets embedded in packets as they flow back and forth along the links is that of slack-space advisement (and/or back-pressure reports). If a data receiving device such as 103 has slack space in its ingress buffers, it may send slack-space advisements back to its potential data sources (e.g., to device 102) to inform them of the available buffer space. The core processor 190 in device 102 may respond to such slack advisement by dispatching a higher density of egress traffic to the destination device (e.g., 103) that advises it has slack space. Alternatively or additionally, if a data processing device such as 102 is close to running out of processing bandwidth or egress-side buffer space and thus its ingress buffers are on the verge of overflow, the data processing device (102) may send back-pressure reports to corresponding sources (e.g., back to device 101) to inform them of the threatening overflow situation and to thereby ask them to temporarily stop sending more data to the overwhelmed receiving device (102). The traffic management intelligence in device 101 is expected to respond to this by reducing the frequency of data dispatch heading toward the back-pressuring destination (e.g., 102). Slack advisement and backpressure are similar concepts except that backpressure is often reactive while slack advisement can be proactive (the data receiver can predict that it will have slack space even before it actually does). Irrespective of which type of traffic flow management technique is used (slack advisement, backpressure or both), data handling devices such as 102 need to be responsive to the changing environment around and within them and they need to intelligently manage the density of data traffic being sent out along different ones of their egress paths (e.g., 164.0-164.n) in view of ever changing conditions within the network (111-11N, 104) that they reside in.

In a PCI-Express environment, management of data flow can be a little more complicated than just worrying about the raw number of packets being sent out to a link partner. There are different kinds of packets (i.e., TLP types: PT, CP and NP) and these may need to be managed differently because of unique functions associated with each type. Shown at 115 is an exemplary data packet. The data packet typically has a header section 115a, a payload or message section 115b and an error checking and/or correcting section (ECC or CRC) 115c. Each packet may have its own unique length 115d depending on its type and size of internal payload or message 115b. It is to be understood that each of links 111-11N and 104 carries digital data packets similar to 115 except that the specific structures, lengths and/or other attributes of packets in each link may vary from application to application. (For example, some packets may not include ECC sections like 115c.) Under some communication protocols, the source device (e.g., 102) first requests access through a network pathway that includes the corresponding link (e.g., 11N), and a domain controller (not shown) must first grant that request, whereupon the source device (102) can then stream a continuous sequence of packets (identified by unique sequence numbers) through the allocated network pathway; and then, when finished, the source device (e.g., 102) relinquishes use of the pathway so that other in-network devices can use the relinquished network resources. Since other devices may be waiting to use the allocated network pathway that includes link 11N, if device 102 leaves empty (unused) time slots on that pathway 11N, such empty slots may be seen as a waste of network resources. It is desirable to manage the traffic egressing from intelligent devices such as 102 so that each allocated link or pathway is kept busy as often as possible so as to not waste resources or prolong the wait of the other devices wanting to use the same network path 11N.

Referring to the header section 115a of the illustrated packet 115, PCI-Express has some unique attributes among which is use of different types of data exchanges. Among the different exchange types there are DLL packets (DLLP's) which provide communication between the DL layers of link partners (e.g., 102-103) and TL packets (TLP's) which provide communication between the TL layers of link partners (e.g., 102-103). TLP's may come under different types such as those belonging to non-posted split transactions and posted transactions. This is summarized in box 115e of FIG. 1A. The split transaction usually involves two types of TL packets: a completion TL packet (CP) and a companion non-posted TL packet (NP). The posted transaction uses a third type of TL packet identified, appropriately, as the posted transaction packet (PT). DLLP's also come in different types (not shown). The packet type designation may be specified in the header section 115a of the PCI-Express packet or elsewhere in the packet. Often it is desirable to move completion packets (CP's) back to requestor devices as soon as possible in order to allow the requestors to continue with internal processes rather than wasting time waiting for completion acknowledgements. As such, it may be desirable in some instances to have different scheduling tables and/or separate buffers in a PCI-Express system for the different kinds of packet types (PT, CP, NP) and not just one common scheduling table and one common buffer for all the egressing data of a given port. For sake of simplicity, FIG. 1A assumes that there is just one common scheduling table (i.e., 194.0) for each given port (i.e., Port_0) of the corresponding device 102. It is to be understood that more complex structures are within the contemplation of the disclosure (i.e., a separate public scheduling table for each kind of egressing packet (PT, CP, NP)).

Aside from packet type, the header 115a will often identify a destination for the packet 115 (and optionally—although not true in PCI-Express 1.0—a time stamp for indicating how aged the packet may be due to it waiting in an egress holding buffer for a scheduler (198) to grant it one or more dispatch time slots). Additionally, a portion of the packet 115 will usually contain a unique sequence number placed there by the data link layer for indicating where in a particular stream of packets the particular packet belongs. The sequence number data may be used to reorder payload or message segments if their corresponding packets arrive out of order at a given destination. This can happen for example, if packet number 3 arrives after packet number 10 because packet number 3 had to be resent due to in-transit noise problems.

On occasion, slack advisement data may be imbedded in the header 115a or another portion of the egressing packet 115. The device (102) which is outputting the packet out to the network will be using the packet as a vehicle for advertising to other devices (e.g., 103) on the network how much slack space remains in each of the ingress buffers (not shown) of the advertising device (102). The other devices can use this information in determining how they manage traffic flowing back to the advertising device (102). In reciprocal manner, device 102 will be receiving slack advisement information from other devices (e.g., 103) in the network and using that information to intelligently determine how to manage egress traffic moving from second device 102 to, say third device 103. (Alternatively, backpressure signals may be used as discussed above.)

This is where the egress scheduling tables 194 can come into play. Assume that scheduling table 194.n (n being an integer greater than 0) is controlling how much traffic is being dispatched to third device 103 via link 11N, including perhaps controlling what type of packets (PT, CP or NP) flow in the greatest density from second device 102 to third device 103 via that link. In that case, if the third device 103 advises that its PT ingress buffer is close to overflow (because a small or zero slack amount is being advised), then the second device 102 should responsively adjust its behavior by reducing the amount of bandwidth given to the dispatching of PT packets heading in the egress direction through Port_N (17N) and towards the third device 103. To this end, device 102 will have some form of egress bandwidth adjuster mechanism 191 coupled via a local access pathway 192 to the memory holding the scheduling tables 194 so that adjuster mechanism 191 can modify the scheduling data held in the scheduling tables 194. Bandwidth adjuster 191 may elect for example to give less bandwidth (fewer phases—as is explained below) to PT packets coming from ingress Port_2 (not shown) and more bandwidth (more phases) to CP packets coming from ingress Port_3 (not shown) so as to thereby relieve pressure on the PT ingress buffer of third device 103 for a while.

In the architecture of FIG. 1A, an egress selection engine 198 is constantly conferring with the scheduling tables 194 and using variable data obtained from those tables 194 to decide how to control a set of tristate bus drivers (only one shown at 195A) so as to thereby determine which of awaiting data blocks (which blocks can aggregate to sizes of 16 bytes per dispatch cycle) is to be next placed on tristate bus 197 for dispatch to the TL units of a corresponding one or more ports (multiple ports can be selected in a multicast situation). As will be seen, the egress selector 198 may need to operate very fast and to immediately fetch data from a second, runner-up source buffer if a first source designated by one of the scheduling tables 194 has no data to contribute to bus 197. It is undesirable to leave empty (unused) time slots on dispatch bus 197.

For purpose of completeness, FIG. 1A shows that the ingress routing multiplexer 180 of the system is controlled by an ingress arbiter 184 and the ingress arbiter is responsive to control signals from the core 190. Egress selector 198 may also be responsive to control signals from the core 190. Aggregation of lanes to form the various ports is controlled by a ports configuration controller 179. The latter unit determines, among other things, what the maximum bandwidth is of each port by allocating more or fewer lanes to each port and more or less buffer capacity to each port in view of the variable number of lanes assigned to the port.

Of importance, access to the memory that stores scheduling tables 194 is not limited to the device-internal pathway 192. External devices may be entitled to at least read the contents of the scheduling tables 194 via public pathway 193 if not to alter the contents of the scheduling tables 194 via that public pathway 193. Among the external devices that may need to access the scheduling tables 194 via public pathway 193 is a root complex managing device (e.g., the root host, which host usually is a microcomputer—see FIG. 3). The root complex managing device can use information garnered from the scheduling tables 194 of not only device 102, but also those inside devices 101 and 103 to manage the overall network. It is the expectation of the root complex managing device (not shown in FIG. 1A) that core processor 190 and its associated egress selector engine 198 are operating in accordance with protocol-set specifications in responding to variable data (first scheduling variables) stored in the public scheduling tables 194. As such, designers of device 102 are not free to formulate scheduling tables according to their own desires and to define the functions of the first scheduling variables according to their own desires, but must instead adhere to the protocol-set specifications regarding the data structure and general implications of the public scheduling tables 194.

Figure 1B:
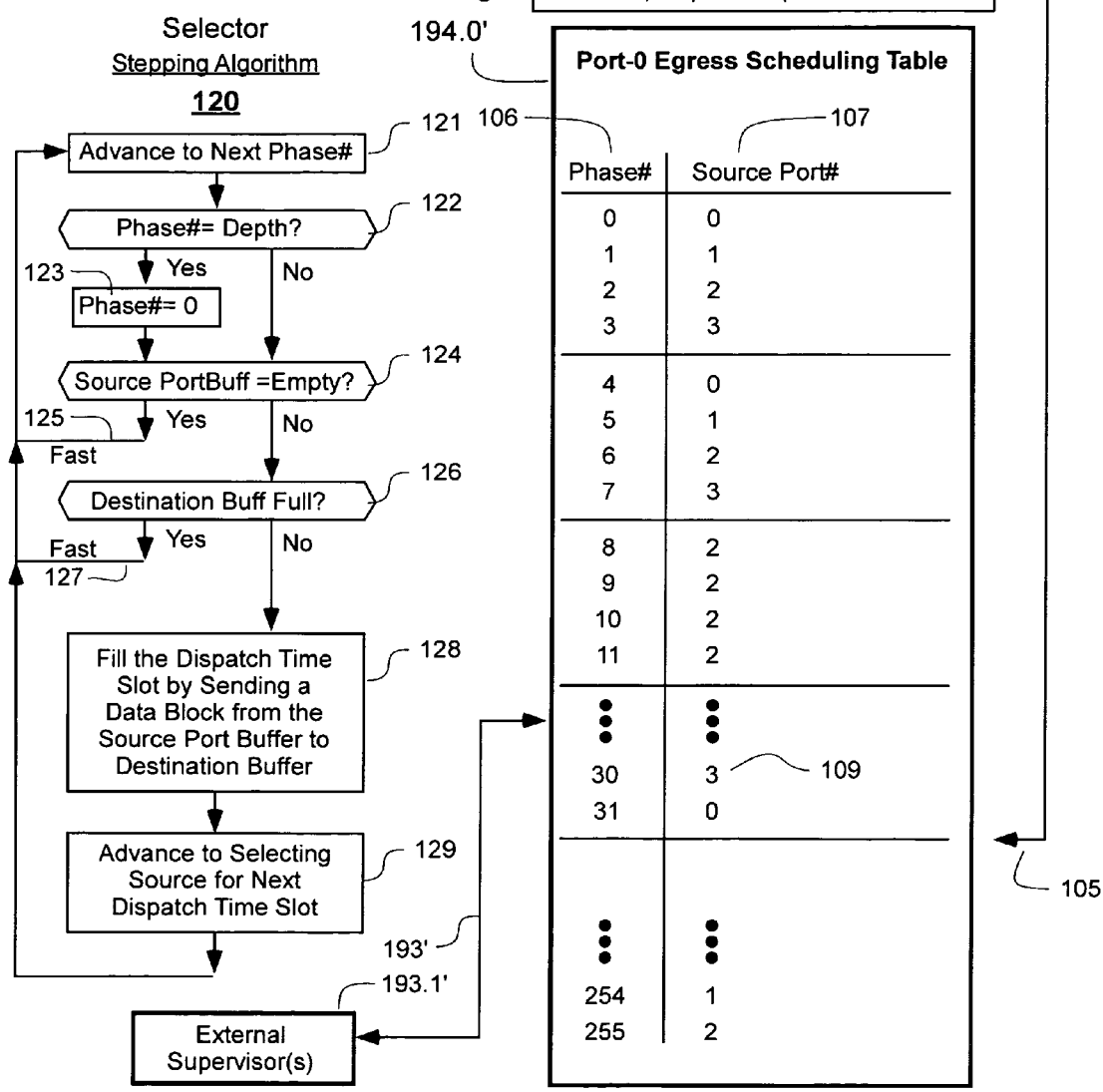
FIG. 1B is a schematic diagram showing a protocol-specified data structure for a conventional scheduling table as used in PCI-Express systems and a conventional stepper algorithm which may be used with the table.

This creates problems as shall now be detailed by referring to FIG. 1B. Shown at 194.0' is a basic data structure for a PCI-Express egress scheduling table. In its simplest form it has just one memory column 107 where each row along that column 107 is assigned a unique phase number. Memory column 107 stores simple integer values (first scheduling variables) each representing an operative port number or an operative source buffer in the core where that source buffer associates logically with a port through which corresponding input data ingressed. For example, if device 102 has been bifurcated into four ports (of say 4-lanes width each), then the port numbers in column 107 may be limited to the values 0, 1, 2 and 3. (In a more complex example, each source port may have 3 buffers respectively dedicated to PT, CP and NP packet types and the number of allowed sources may then be 0 through 11 rather than 0-3.)

Phases can be thought of as being somewhat like offered dispatch opportunities or rights of first refusal for offered time slots. If a source port is empty, (has no packet data to contribute at the moment), the phase is quickly skipped by without giving up on the corresponding time slot and the next phase is queried to see if its source port buffer has data to contribute for dispatch during the still-pending time slot. This may be better understood by referring to stepping algorithm 120. Under the PCI-Express standard, each scheduling table can have a maximum of 256 phases (numbered 0-255). However, not all of the phases in this range need to be active at a given time. A publicly accessible and logically associated register 196.0', known as a depth register, determines what subrange of phase numbers 0-255 will be active for the moment in corresponding table 194.0'. In the example it is subrange 0-31. So the depth of the table is 32 phases in this example.

Assume that the selector (198 of FIG. 1A) has just serviced phase 31 and its operational state is switching to step 121 of the selector stepping algorithm 120. Step 121 increments the current phase count to 32. In decision step 122 it is discovered that the current phase count equals the depth value stored in register 196.0. In that case (Yes), control passes to step 123 where the phase counter is reset to 0. In next step 124, a determination is made as to whether the source port of phase 0 is empty or it has packet data to contribute to the currently pending time slot on dispatch bus 197. Assume that source port #0 is empty at this moment and therefore Yes path 125 is quickly followed to loop back to step 121. Under PCI-Express rules, this process is intended to consume essentially no time so that the pending time slot on dispatch bus 197 is not wasted. While still consuming essentially no time, the process repeats through step 121 (where the phase count increments to equal 1), step 122 (where the determination is made that the phase count does not equal the depth value, 32) and into step 124 (bypassing reset step 123 this time).

Assume that that the assigned source port (#1) of phase #1 does have data to contribute at this moment and therefore the answer to step 124 is No. Control now passes to algorithm step 126 where an inquiry is made as to whether the destination buffer is full (not enough slack space to accept the next block of packet data). In one embodiment, there are actually three, egress destination buffers, PT, CP and NP in the TL layer of each shared port. The queried one of these three destination buffers depends on the packet type (PT,CP or NP) of the data that is coming out of the source port of the current phase. If the answer to step 126 is Yes, a fast loop back 127 must be made to step 121 to repeat the process yet again. This fast loop back 127 is expected to consume essentially no time so that the pending time slot on dispatch bus 197 is not wasted.

It is assumed for the sake of cutting to the chase that the answer to inquiry step 126 is No and the process proceeds to step 128. In step 128, the packet data block from the source buffer of the current port is moved into the active destination buffer (e.g., into one of the PT, CP and NP dispatch-receiving buffers) and the pending time slot on dispatch bus 197 is then deemed to have been filled with useful data. At step 129, the process is allowed to advance to servicing the next available time slot on the dispatch bus 197 by repeating from step 121 all over again.

While all this is going on, external supervisory units (193.1') are entitled to access the first scheduling variables stored in identified ones of the phases and to change one or more of them at a time in accordance with predefined software that is driving the external supervisory units (and by using access path 193'). More specifically, the scheduling variable 109 stored in the position of phase number 30 is a 3 in this example. A scheduling manager may access the memory location of scheduling variable 109 and change it from a 3 to a 2 for example. What this does is to generally give more bandwidth to data being sourced from port#2 while offering fewer dispatch opportunities to data being sourced from port#3. Later, the same or a different scheduling manager may access the memory location of scheduling variable 109 and change it from a 2 back to a 3, or to a different source identifier.

It is easiest to understand what the big picture intent is of the scheduling table structure 194.0' by first assuming that all active ports (0-3 in this example) have full source buffers, that all the destination buffers are not reported as full, and thus algorithm 120 simply steps down table 194.0, dispatching a next block of data from each successive source port according to the sequence of values (first scheduling variables) stored in column 107. So for phases 0-7 there will be an equitable allocation of time slots in a round robin manner where data is successively dispatched from source ports 0-3 and out through the shared egress path 164.0 of port 0 (because table 194.0 is the egress scheduling table for port 0). Starting at phase 8, heavier weighting of opportunity to dispatch is given in favor of source port 2. Any further arrangement of source port numbers may be programmed into table 194.0 until the bottom-of-depth phase, 31 in this example, is hit. Because the depth value in register 196.0 is 32, phase #31 will be the last one serviced during a down scan through the table and then algorithm 120 will loop back to offering the source port of phase #0 an opportunity to dispatch its data (if any) at the next time slot on bus 197.

In one embodiment, at any time during the looping process, the end of table pointer 105 may be moved to point to a new effective end of the table (by changing the depth value in register 196.0) and the number of phases (or dispatch opportunities) offered to each source port can be quickly changed. Thus this system allows for very rapid changing of the effective schedule with the change of a single register, 196.0. Values below the end of table pointer 105 can be changed in real time without affecting the upper looping portion of the table and then the depth register can be altered in one cycle to bring a whole array of new port assignments into play. (In the conventional PCI-Express 1.0 system, such a change of depth is not allowed. Depth is set during lane aggregation for each port and then fixed at that value.)

These are some of the positive attributes for the PCI-Express mandated design of scheduling table 194.0 (and depth register 196.0). But there are also some fundamental problems. One has to do with the suggested timing constraint asking that loop-back paths like 125 and 127 in the stepping algorithm 120 be performed in essentially zero time. One way to achieve that required result is to use parallel processing hardware with look-ahead capability. In other words, rather than doing things sequentially, a giant look ahead logic circuit is built for determining ahead of time what the outcomes will be of decision points 124 and 126 for all in-play phases. Then the circuit knows very rapidly what next, not-empty, not-overcongested phase it will service in a next coming time slot just as it finishes a previous dispatch operation in step 128 and readies itself for servicing the next dispatch time slot in step 129.

It is believed that to date no commercial implementation allows for parallel processed look-ahead covering all 256 phases in table 194.0'. At best, a practical implementation for parallel look-ahead might allow for no more than 32 phases. The reason is that the circuitry of the look-ahead logic becomes too large and too cumbersome for table sizes larger than about 32 phases. The alternate solution is to not comply with the zero-time loop-around requirement in algorithm 120, in which case time slots are sometimes wasted on the dispatch bus 197 and the hardware does not operate at full efficiency. This hardware implementation problem was apparently not foreseen at the time that the protocol rules were devised for section 7.11.19 of the base PCI-Express specification.

Another drawback of section 7.11.19 specification relates to undesirable bunching of slot offers to a given source port. Take for example Port #0 as it appears in column 107 of FIG. 1B. Only 3 occurrences of Port #0 are illustrated in column 107. Assume for the moment that is all there is among the 32 active phases, meaning that Port #0 will be offered only 3 dispatch opportunities for every pass down scheduling table 194.0'. Assume moreover that an external supervising unit (i.e., a root host) decides that Port #0 should now start receiving 4 dispatch opportunities for every pass and that this increase of bandwidth for Port #0 should come at the expense of removing one dispatch offering from those given to Port #3. Suppose that the external supervising unit overwrites the "3" in the Phase#3 row of FIG. 1B with a "0" to effectuate this change because, for example, that is the first instance of a "3" that the supervisor's software finds for writing a "0" over. What happens as a result of the overwrite is that now there will be two "0"s bunched together at phase numbers 3 and 4. Suppose further that the source buffer of Port #0 tends to be empty on a fairly regular basis. It has only one block of data to offer every so many phases rather than having a large backlog of data blocks ready for dispatch in one succeeding phase after another. As a result, after the source buffer of Port #0 is serviced by the overwritten phase #3, the source buffer will be empty as phase #4 next comes around and step 124 of algorithm 120 will quickly bypass the phase #4 opportunity. As a result, source port #0 is still getting only 3 effective offers per pass. The bunched addition of another slot provided no substantial increase in effective bandwidth. On the other hand, if the "0" had been overwritten into the row of phase #7 (but not that of phase #30) for example, the extra slot (with less bunching) may have provided a substantial increase to the effective bandwidth allocated to source port #0. The data structure of scheduling table 194.0' does not per se prevent or reduce the bunching problem.

FIG. 2A illustrates a re-mapping system 200 in accordance with the invention which provides solutions to these types of problems. The protocol-mandated, public tables (i.e., table 194.1" for egress port-1) are maintained in a publicly accessible region 201 of device memory. A table re-mapper 202 is used to generate from each public table (e.g., 194.1", 194.0 of FIG. 1A, . . . , 194.n) a corresponding, second scheduling table like 203 that has a re-mapped data structure and second scheduling variables (i.e., 209) derived form the first scheduling variables (i.e., 109) of the corresponding first scheduling table. In one embodiment, a first column 207 of the re-mapped table 203 stores or represents identifications of the currently formed ports (and/or their corresponding source buffers) from which data is to be selected for dispatch to the given egress port (and/or its corresponding destination buffers) of that second table 203. (Recall that the numbers of active ports in a given device and the number of lanes allocated per port may change dynamically under the PCI-Express standard.) A second column 206 of the re-mapped table 203 stores initial weight values (i.e., 209) assigned for each of the currently formed ports. A third column 205 (optional) of the re-mapped table 203 may be used to store temporary reducer (or enhancer) values for forming effective weights for each of the currently formed ports. A fourth column 204 of the re-mapped table 203 stores temporary effective weight values (or "residual" values as they are also referred to herein) for each of the currently formed ports. The effective weight values (residuals) are used for determining which source port (i.e., 0-3) or source buffers will be next offered a dispatch opportunity in a current dispatch time slot. A fifth (optional) column 208 of the re-mapped table 203 stores flags indicating at least if the corresponding source port buffer is empty (this corresponding to step 124 of FIG. 1B); or in one embodiment, indicating the truthfulness of the condition: that the corresponding source port buffer is empty OR the destination buffer is full (this corresponding to steps 124-126 of FIG. 1B).

Before going into the details, it is to be noted here that the re-mapped table 203 generally has a much smaller number of rows than does the corresponding, public scheduling table 194.1". This is so because the number of formable ports is generally much smaller than the maximum number of protocol-allowed phases. Accordingly, if a table-driven selector engine 210 were to be constructed with look-ahead logic circuitry that responds to data in the re-mapped scheduling table 203 (i.e., for determining which source port is the current lightweight champion), that look-ahead based logic circuit 210 can be fabricated to be much smaller and less consuming of power than an alternate look-ahead logic circuit that is constructed to simultaneously service the maximum possibility of all 256 potential rows of the public scheduling table 194.1" in parallel. Under PCI-Express rules, the maximum number of formed ports is 32. (In one embodiment though, the maximum number of ports is limited to 16.) Accordingly, for the PCI-Express standard or a system that sets a smaller limit value for itself regarding the number of formable ports per device, the look-ahead logic circuit need not be any larger than what is necessary for parallel-processing across that maximum number of formed ports (or maximum number of source buffers). Design and implementation of the look-ahead circuit (210) is therefore greatly simplified by the remapping performed by unit 202 from the to-be-looked-at many-phase domain of table 194.1" (where there is a maximum of 256 phases per PCI-Express rules) to that of having just 32 (or fewer, i.e. 16) as the maximum number of dynamically defined ports whose states need to be examined in parallel by the table-driven selector engine 210. It will be seen later that the system of FIG. 2A can also alleviate the bunching problem.

In one embodiment, the re-mapper unit 202 counts the number of times that each source port number appears in column 107' down to the effective depth 105" of the corresponding public table (i.e., 194.1" for scheduling egress through Port-1) and calculates a corresponding "weight" value as a function of the count. The weight should be indicative of the relative proportion of times that the source port number appears down the currently effective length of column 107'. By way of example, assume that the table depth 105" is 64 and that the identifier for source port #3 appears 32 times down the currently effective length of column 107' while the identifier for source port #2 appears 18 times, that for source port #1 appears 11 times and that for source port #1 appears 3 times. (Note that 32+18+11+3=64.) In the example, the weight calculating function 216 is Wt.=(Depth*K)/(count) where K is a positive integer, preferably 1 or greater and in this case equal to 2. The result is rounded to the nearest integer and saturates at a predefined upper bound value greater than that of (Depth*K)/1, for example 128+1=129 in the case where depth equals 64 and K=2. The initial weights obtained for source ports 0-3 in the case of FIG. 2A are therefore in respective order: Int(128/3)=43, Int(128/11)=11, Int(128/18)=7 and Int(128/32)=4.

Although the example shows a case where the calculated weight value (column 206) is directly proportional to the effective table depth divided by phase count and it saturates at a predefined upper bound limit, it is within the contemplation of the disclosure to vary from that approach as may be deemed appropriate by the system designer under certain conditions and the re-mapper 202 may switch among different formulations in response to detections of conditions specified by the system designer or as instructed by a root host. For example, the calculated weight value may be formed as a linear or nonlinear function of the effective table depth and the phase count. A simple formulation might be Weight=Depth-Count. If the effective table depth is fully populated by just one port number in column 107' then the weight will be zero. By contrast in the case where Wt.=(Depth*K)/(count), the weight for the one source port will equal to K rather than zero when column 107' is populated by that one source port number. The weights for the remaining source ports will be the predefined upper saturation value (which is picked as a saturation response to attempted division by a phase count of zero). In one embodiment, when the initial weight equals the predefined upper saturation value (i.e., 256), the corresponding source port is never given an opportunity to dispatch packet data to the destination buffer. In one embodiment, when the initial weight equals zero (or another predefined lower bound value), the corresponding source port is always given exclusive opportunity to dispatch its packet data to the destination buffer and other source ports are blocked out even if their weights are other than the predefined upper bound value (i.e., 256). In the case of a weight tie (even if as between zero weights), in one embodiment, the source port having the lower port number is given priority. The selector engine 210 may include means for temporarily resetting the effective weight of a given source port to zero or to the predefined upper saturation value (or to a value in between) in response to detection of certain external conditions (i.e., backpressure or slack space conditions) irrespective of what the normal weight calculating function is for column 206.

Once initial weights are filled into column 206, in one embodiment, they are initially copied into the residuals column 204 (also referred to as the effective weights column 204). The table-driven selector engine 210 then takes over control. In one embodiment, the table-driven selector engine 210 determines which source port has the currently lowest effective weight (in column 204) and picks that one port whose effective weight is closest to zero as being the winner for that selection round. In the case of a tie, the lowest numbered source port wins (or the highest, as long as the tie breaker method is consistently fair).

Figures 2B, 2D:
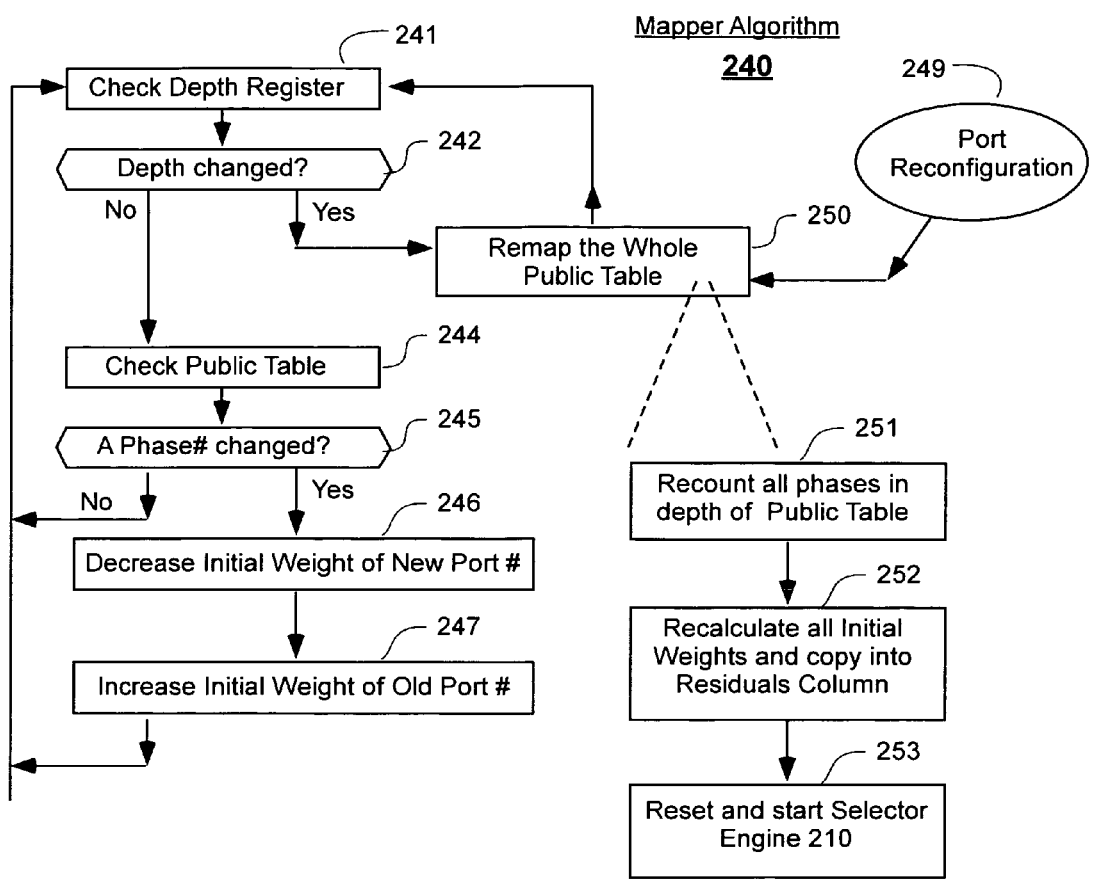
FIG. 2B is a flow chart of a mapper algorithm in accordance with the disclosure.
FIG. 2D is a timing diagram showing an exemplary run of one embodiment of FIG. 2C wherein the residuals group is controlled to hover above a predefined reference bar.
Figure 2C:
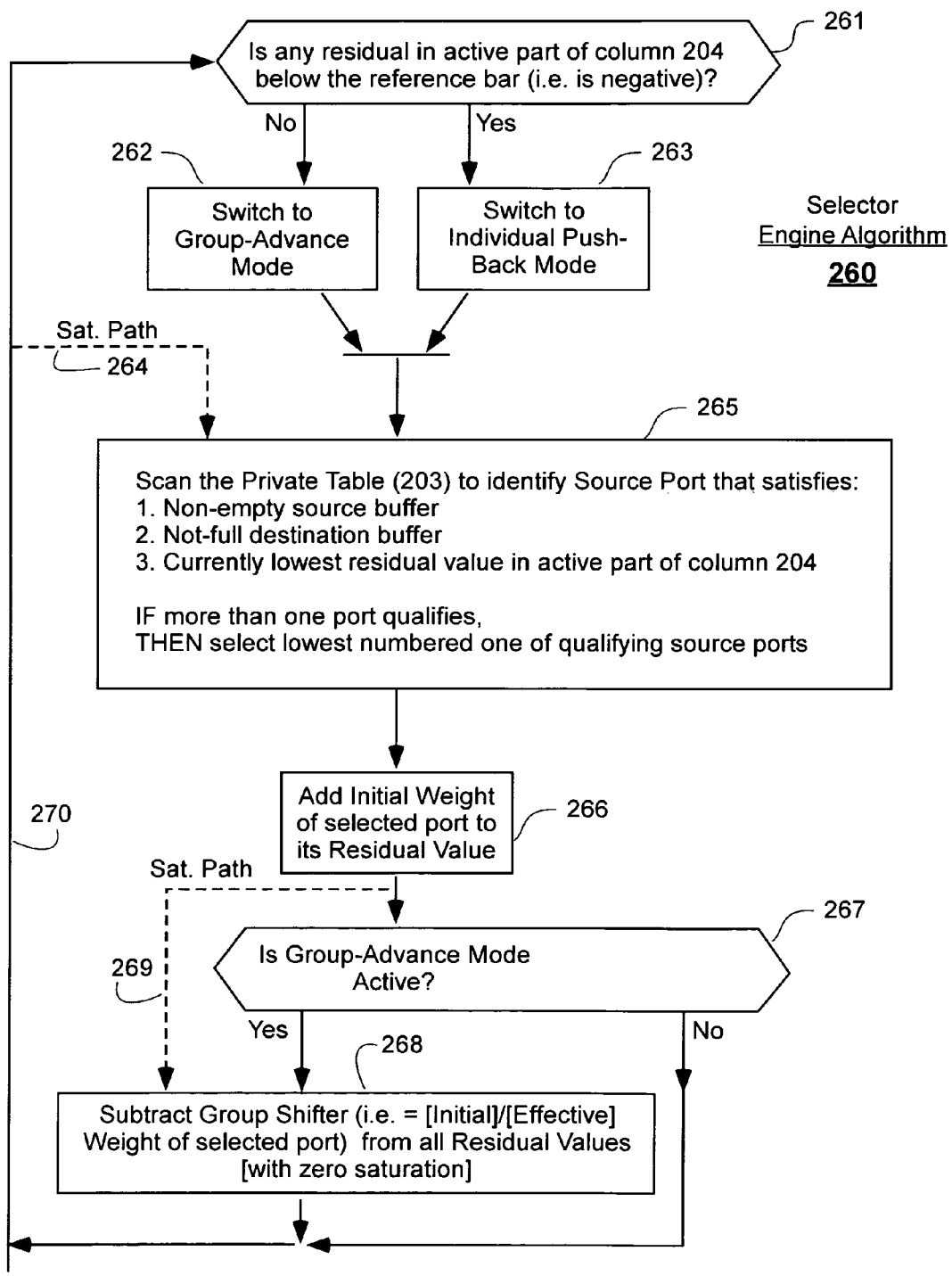
FIG. 2C is a flow chart of a selector engine algorithm in accordance with the disclosure.

In one embodiment, a zero is placed into reducer column 205 at the row position of the winner (e.g., source port #3 when it had the lowest effective weight equal to its initial weight of 4) and a negative version of the initial weight (or effective weight—depending on choice of algorithm) of the winner is placed in the row positions of all the other source ports so as to subtract that amount from their current effective weights (col. 204). In one embodiment, the latter subtraction operation (col. 205 subtracted from col. 204) includes a saturation function that saturates the result at a lower bounding limit such as zero. In other words, in a saturated subtraction situation no source port can have an effective weight less than zero in this example. (Any other lower saturation bound could have been used as will be appreciated shortly.) In the next selection round the effective weights of source ports 0-3 will be 39, 8, 3 and 4 as is illustrated. The effective weight of Port #2 has now in effect moved closest to the winner's bar 214a (whose effective weight is 0) because port #2 has the lowest effective weight (a 3) while Port #3 has slipped further away, relatively speaking, from the winner's bar 214a because Port #3 now has the next lowest effective weight (a 4). The other ports (#0 and #1) have crept slightly closer towards the winner's bar 214a because their effective weights have dropped (from 43 to 39 and from 12 to 8 respectively) during this same weight re-shuffling cycle. The creeping down of the effective weights of ports #0, #1 and #2 towards the winner's bar value 214a is represented by arrow symbol 214b. The relative shuffling back of the effective weight of port #3 away from the winner's bar value 214a is represented by arrow symbol 214c. Upon further study of the methods disclosed herein it will be appreciated that the smallest effective weight (i.e., of source port #3 among the active group #0-#3) can, among other things, represent a measure of how far the bottom of the group of effective weights (43, 12, 7, 4) is from the winner's bar 214a; and that by subtracting this relative amount across-the-board, from all weights in the group, the group of effective weights (now 39, 8, 3, 0 for the moment) is being moved closer to but not below the winner's bar 214a (whose effective weight value in this example is zero). Then, by adding the initial weight of the winner only to the effective weight (204) of the winner, the winner port (i.e., #3 in this example) is being effectively moved away from the winner's bar 214a by an amount equal to (or alternatively corresponding to) its initial weight while the effective weights of all the other ports have remained relatively standing still after the across-the-board subtraction. A variety of different and/or alternate algorithms may be devised for determining the amount of towards-the-bar shuffling 214b that the effective weight(s) of one or more ports will experience and/or the amount of away-from-the-bar shuffling 214c that one or more such effective weights will experience in each arbitration round (as carried out by selector 212). At least one other approach will be discussed when FIG. 2C is described. One of the general guidelines is that the values for the effective weights (in col. 204) should not be allowed to arbitrarily migrate towards extreme high or low values such that digital representation of those effective weights require more bits for storage than generally needed by instead keeping them hovering close to, say the zero value bar. In one embodiment, the winner's bar 214a may be viewed as having an implicit value of zero and the shuffling algorithm for the effective weights may be viewed as controlling the effective weights so they hover close to, but above this bar 214a while causing the selection of winners to approximate the selection frequency indicated in the public scheduling table (194.1"). It is within the contemplation of the disclosure to use other queue shuffling schemes that effectuate a rough approximation of the selection frequency indicated in the public scheduling table (194.1"). One concept intended to be conveyed here is that the winner of a selection round (i.e., port #3) is shuffled back in relative position along the queue by an amount equal to, or corresponding to its initial weight so that heavy weights (i.e., port #0 whose weight is 43 in the example) move relatively farther back behind the front line 214a of the queue after having won a round and so that relative light weights (i.e., port #3 whose initial weight is 4) shuffle back by a relatively smaller distance behind the front line 214a after having won a servicing round. As such, the relative light weights (i.e., port#3) will return to the winner's bar 214a more often than the relative heavy weights (i.e., port #0).

Continuing with the ongoing example, in one embodiment, the queue shuffling algorithm first adds the initial weight (206) of the winner to the winner's effective weight and then the queue shuffling algorithm subtracts the old effective weight (204) of the winner (i.e., port #3) from all the current effective weights of all competing ports so as to produce the new effective weight values. (The running of such an algorithm is also illustrated in FIG. 2D, described below.) After unit 212 has identified the source port (e.g., #3) with the current lowest effective weight (and lowest port number in the case of a tie), unit 220 offers the open time slot on the dispatch bus (or other dispatch means) to the selected source port or winner. The selected source port can accept or decline the offer depending on the state of the source port buffer and/or the state of the destination buffer. This accept or decline operation can correspond to steps 124 and 126 of FIG. 1B and may be carried out with use of serial testing as is implied by the flow chart of algorithm 120 (FIG. 1B) or alternatively with parallel-in-time testing as will be detailed below. In other words, in the case of serial testing; after unit 220 offers the open time slot, the selected source port (i.e., #3) tests its source buffer to determine if it is empty (step 124 of FIG. 1B) and it tests the state of the destination buffer to determine if it is full (step 126) and then it reports back either an acceptance of the offer or a decline to unit 220. In the case of a decline, pathway 222 is followed back to table 203, the declining source port is temporarily eliminated from the list of competing source ports and the next lightest (in terms of effective weight) port is selected by unit 212. The process then repeats until an accepting source port is found.

Such a serial testing approach can consume an undesirable amount of time. The preferred approach is to instead pre-test all the formed source ports in parallel so as to determine ahead of time (before selection of the lowest effective weight) if any of the competing ports have non-empty source buffers and/or if their intended destination buffer has slack. Parallel pre-testing of all the formed source ports may be performed with use of the empty-source/full destination flags in column 208. In one embodiment, for each time slot on the dispatch bus 197, each source port writes into its respective flag area of column 208 an indication of whether its source buffer is empty and/or whether the intended destination buffer is full. Unit 212 of the table-driven selector engine 210 checks the flags 208 at the same time that it sorts in parallel through column 204 looking for the lightest effective weight and it seeks out the lightest effective weight whose disqualification flag(s) (208) are not checked. Thus the selector unit 212 identifies in essentially zero time (early within the dispatch clock cycle) which source port which has the lightest effective weight and is not disqualified by virtue of having an empty source buffer and/or an overfull destination buffer. As a result, there will be no declining (via path 222) of the identified source port and the process will flow immediately along path 221 (accepted) into table-reshuffling unit 230.

Reshuffling unit 230 modifies the contents of at least the residual values column 204 by computing the weight reducers (or enhancers) of column 205 and applying these via connection path 232 to the old values in the residual values column 204 so as to produce new residual values for the next selection operation of unit 212. Recall that at the start of the process (after mapping or re-mapping by unit 202), the residuals column 204 contained the same list of values as did the initial weights column 206 (namely, 43, 12, 7, 4 in top to bottom order). The first time that selection unit 212 scanned the residuals column 204, unit 212 determined that source port #3 had the lowest effective weight of 4. The open dispatch slot was then granted to the egress data of the source port #3 and at about the same time, table-reshuffling unit 230 used the values shown in reducer column 205 to generate the new residual values as shown in column 204 (namely, 39, 8, 3, 4 in top to bottom order). Next, as selection unit 212 again scans the residuals column 204, unit 212 will determine that source port #2 now has the lowest effective weight of 3. The next open dispatch slot is granted to the egress data of source port #2 and at about the same time, table-reshuffling unit 230 reshuffles the residual values. In one embodiment, the winner's initial weight (of 7 as shown in column 207) is added to the residual in the winner's row (thus producing a temporary 10 in row #2—not shown). Subsequently (or at an earlier or simultaneous time), the old effective weight (a 3) of the winner is used as the new, cross-the-board reducer value applied to all residuals in column 204 to thereby generate the new residual values. The new residual values that will appear in column 204 (not shown) will be in top to bottom order: 39−3=36, 8−3=5, 3+7−3=7, and 4−3=1. As a result, source port #3 will again have the lowest effective weight for the next round and the just serviced port #2 will have been pushed back in the queue by a relative distance corresponding to or equal to its initial weight (of 7). In yet the next round, wherein source port #3 has the lowest effective weight, the new residual values that will appear in column 204 (not shown) will be in top to bottom order: 36−1=35, 5−1=4, 7−1=6, and 1+4−1=4. Because port #1 now ties with port #3 in effective weight, the lower numbered port #1 will be given a chance and declared a winner. Note that during these rounds the most heavily weighted source port, #0 is slowly creeping down in value toward the value (i.e., 0) of the front line bar 214a of the queue (towards having the lowest effective weight). Eventually source port #0 will also have its turn. Then it will be pushed to the back of the queue due to addition of its large initial weight (i.e., 43) and it will again start creeping forward towards the winner's bar 214a. All the while, the port with the lowest initial weight (port #3 in this example) will be the most frequent winner because it is shuffled backwards (214c) in the relative values queue by the least amount (by it relatively low initial weight of 4) after each of its wins. This weighted pushback of the various source ports/buffers has the effect of smoothing out the allocation over time of dispatch opportunities to the different source ports or source buffers and thus of avoiding or reducing the bunching problem mentioned above.

Referring to FIG. 2D, a more detailed example is shown. Port #C has the largest initial weight at time point 0 (a weight of 9) while Port #A has the smallest initial weight (a 3). In the case of a tie between the effective weights of A, B and C; A wins. In the case of a tie between B and C; B wins. At time point 0, A is the winner because it has the lowest among the effective weights (which weights were set equal to the respective initial weights). Between time points 0-1, all effective weights are reduced by the effective weight of the winner (by 3) and then the initial weight of the winner (also a 3) is added to the current effective weight of the winner. Thus B and C advance towards the winner's bar (represented by right-pointing arrows) while A is held back. Despite this, at time point 1, A is again the winner because in a tie with B, A wins. Between time points 1-2, all effective weights are reduced by the effective weight of the winner (again by 3) and then the initial weight of the winner (also a 3) is added to the current effective weight of the winner, A. Thus B and C again advance towards the winner's bar (represented by right-pointing arrows) while A is again held back.

At time point 2, B is the new winner because B has now attained the lowest effective weight (a 0). Between time points 2-3 all effective weights are reduced by the effective weight of the winner (B's Eff. Wt. of 0) and then the initial weight of the winner (6) is added to the current effective weight of the winner, B. Thus A and C remain 3 steps away from the winner's bar but advance relative to B (represented by right-pointing arrows) while B is pushed back by its initial weight (6). At time point 3, A is again the winner. At time point 4, heavy weight C finally gets is turn. At time point 11, the pattern of time point 0 is recreated. Thus it is understood that the result of time point 12 will be the same as that of time point 1, 13 will be the same as 2, and so on. In this example it is assumed that none of source ports A, B and C is ever empty and none of their destination buffers is ever overfull. It may be seen that in the eleven arbitration round of time points 0-10, A is a winner 6 of 11 times, B is a winner 3 of 11 times, and C is a winner 2 of 11 times. A K factor of 18/11 may be used to convert the reciprocal of A's win frequency (11/6) into its initial weight of 3. Similarly for Port #B, 11/3 times a K of 18/11 produces an initial weight of 6. Similarly for Port #C, 11/2 times a K of 18/11 produces an initial weight value of 9.

Referring to FIG. 2B, one possible algorithm 240 for automatically managing the re-mapper unit (202) is shown. During network bring up or network re-configuration (starting at step 249) the entirety of each of the plural public scheduling tables (194.0-194.n where n is determined by the reconfiguration manager) can be changed. Thus, in step 250, the re-mapper unit (i.e., 202) of a given public scheduling table (i.e., 194.1" of FIG. 2A) responsively remaps its whole public table into a corresponding private table (i.e., 203) using a weight calculating formula such as 216 or otherwise as instructed by the reconfiguration manager. (Not shown in FIG. 2B but typically it is the root host. See FIG. 3.) In one embodiment, step 250 is comprised of the substeps of counting or re-counting (251) the number phases present for each active port number (or source buffer) in the range of the current table depth, calculating or re-calculating (252) the initial weights to be assigned to the active ports (or source buffers) and copying the results into columns 206 and 204 of the corresponding private table 203, and finally resetting and restarting the selector engine (210) to start processing the new mapping in the private table.

After the full table mapping or remapping takes place in step 250, control transfers to step 241. It is assumed in this example that the contents of the depth register (i.e., 196.1" in FIG. 2A) can change after port reconfiguration. It is to be noted however that under the conventional PCI-Express standard specification, the contents of the depth register can only be changed during the port reconfiguration process 249. If the latter is true, steps 241-242 may be deleted from algorithm 240 and control may instead pass from step 250 directly to step 244. Steps 241-242 test to determine if the contents of the corresponding depth register have changed. If Yes, control is returned to step 250 and the public scheduling table is again remapped into the private one using the new depth value. If No, control passes to step 244.

Steps 244-245 test to determine if the contents of a given phase entry in the corresponding public scheduling table have changed. If No, control is returned to step 241 (or to 244 if depth changes are not allowed). If Yes, control is given to step 246 where the initial weight (in private table 203) is decreased for the source port whose number has been newly written into the changed phase position. Control is also given to step 247 where the initial weight (in private table 203) is increased for the source port whose number has been erased from (or overwritten by the new one at) the changed phase position of the modified public scheduling table. Then control is returns to step 241 (or 244 if depth change is disallowed). The methods employed for respectively decreasing and increasing initial weight values in steps 246 and 247 may utilize the more complex calculations (i.e., multiplication and division as shown at 216) used for initially remapping into the private table (203), or alternatively in one embodiment, a simple count decrement and count increment (typically by deltas of −1 and +1 respectively) may be used to respond to single phase changes to the public scheduling table (i.e., 194.1"). The speed of this phase by phase revising of the private table (by steps 246-247) is notable because in some systems, changes to the public scheduling tables can come from multiple sources.

Referring to FIG. 3, shown is one example of a system 300 in which changes to public scheduling tables (e.g., 311, 321) can come from multiple sources. A simple PCI-Express system typically has just one root host (i.e., a microprocessor) for overseeing the management of network wide bandwidth allocations. More complex PCI-Express systems can have multiple root hosts (i.e., 301, 302) each exerting primary dominion over its respective root complex (i.e., 310, 320). However, traffic may flow between the root complexes 310, 320 and as such each root host (i.e., 301, 302—there could be more, and more root complexes) may need to keep tabs on, or even exert control over the public scheduling tables of devices in external complexes. As such, FIG. 3 shows a cross-complex, access connection 393.3 between root host 302 and public scheduling table 311. FIG. 3 shows a cross-complex, access connection 393.4 between root host 301 and public scheduling table 321. This is in addition to the in-complex access connections such as 393.1 and 393.2. The public scheduling tables (i.e., 311, 321) are also typically adjustable by the local bandwidth adjustment units (i.e., 314, 324) of their respective local devices. This is illustrated by local connections 392.1 and 392.2.

Devices #1 and #2 of FIG. 3 are just two of a large plurality of similar devices (#3-#N and #4-#M) that may be provided in each root complex and may have respective public scheduling tables (not explicitly shown) that are modified by plural managers (i.e., 301, 302). Given that there a potentially large number of independent adjusters (i.e., 301, 302, 314) operatively coupled to each of many public scheduling tables (i.e., 311), the corresponding re-mapping engine (i.e., 312) should be able to respond to the many public changes that could be applied to its corresponding public scheduling table(s) by quickly making corresponding changes to the corresponding private scheduling tables (i.e., 313) so that the respective selection engines (316) can then quickly alter their behavior in response to changes made to the public scheduling tables (311). That is why the phase-at-at-time modification capabilities provided by steps 246-247 of re-mapper algorithm 240 (FIG. 2B) are worthy of note.

For sake of completeness, FIG. 3 also shows the operative couplings of the selection engines (316, 326) to their respective source port buffers (317, 327) and destination buffer means (318, 328—which could be buffers in the TL layers of the device ports). The destination buffer means (318, 328) may report to the selection engines (316, 326) regarding local buffer full or buffer slack conditions. The source ports (317, 327) may similarly report to the selection engines regarding local buffer full or empty conditions. The selection engines (316, 326) may operate in accordance with the concept illustrated in FIG. 2A when determining which source port will be granted a dispatch time slot for the data dispatching means (i.e., 197) of the local device ports. Additionally, the local bandwidth adjustment unit (314, 324) of each network device may be allowed to make temporary modifications to the effective weights (residuals) stored in the private scheduling table (313, 323) without posting the change to the corresponding public scheduling table (311, 321) so as to thereby hide the fact from the root hosts (301, 302). While this may seem like a wrongful action, situations may arise where more is lost from informing the root hosts (301, 302) of the change and having them consume bandwidth for responding to the change than to simply hide the change. Note that a temporary change to one or more residual values does not typically alter the initial weights and thus, as initial weights are repeated added to residuals, the temporary change of residual value fades away on its own. It is within the contemplation of the disclosure to permit the local bandwidth adjustment units (314, 324) of each network device to make very temporary or more permanent modifications to the initial weights stored in the respective private scheduling tables (313, 323) first before posting a corresponding change to the corresponding public scheduling tables (311, 321) so that the effect of the change to initial weights occurs quickly without calling for remapping by remapping units 312 and 322.

Referring to FIG. 2C, a more generalized engine algorithm 260 is shown. The effective weight of the winner bar (i.e., 214a of FIG. 2A) or another reference bar need not be zero. It can be any user-selected value. In step 261, the automated selection engine determines whether any residual value has descended below the reference bar (i.e., whether any residual value is negative if the reference bar value is zero). If No, then the Whole-Group Advance mode is retained in step 262 wherein the whole group of residual values will be later driven in step 268 towards the reference bar (i.e., towards bar 214a of FIG. 2A per arrow 214b). If Yes at step 261, then the Individual Push-back mode for the winner only is entered into at step 263 whereby only the effective weight of the selected winner will later be pushed back so as to move it further away from the winner's bar.

In next step 265, the selection engine (i.e., 210) scans the corresponding private table (i.e., 203) either sequentially or by parallel means (depending on design) to identify the source port (or source buffer) that satisfies qualification criteria 1, 2 and 3. More specifically, qualification criterion 1 calls for a non-empty source buffer. Qualification criterion 2 calls for a non-full destination buffer. Qualification criterion 3 calls for the source port (or source buffer) whose effective weight is lowest (or alternatively, closest to the winner's bar). If more than one source port/buffer satisfies the utilized criteria (criteria 1 and 2 can be optional), then the selection engine uses a consistent tie-breaker algorithm such as picking the lowest numbered, qualifying port/buffer (or the highest numbered one).

In next step 266, the selection engine adds the initial weight of the selected winner to its current residual value (to its weight value in column 204). In this embodiment where the lowest residual value is declared the winner, this step of increasing the winner's current residual value has the effect of pushing the winner away from the winner's bar by a value-measured distance equal to (or alternatively corresponding to in another sense, i.e. proportional to) its initial weight. The greater the initial weight is, the further back the winner gets pushed back in its relative position on the queue and the longer it will take (measured in numbers of arbitrations) for the current winner to return to the winner's circle. Thus, source buffers (or source ports) that are assigned relatively large initial weights get to the winner's bar with relatively low frequency and source buffers/ports that are assigned substantially smaller initial weights get to the winner's bar with relatively higher frequency.

In next step 267, the selection engine determines if the Whole-Group Advance mode is active or alternatively if the Individual Push-back mode is active. If the Whole-Group Advance mode is active (Yes), the engine subtracts a whole-group displacement value from the effective weights of all the source ports (or source buffers). If this subtraction does not include saturation at zero, then the subtraction does not change the relative positions of the sources along the queue. Rather, it merely shifts all the residual values downward. If alternatively, the subtraction does include saturation at zero (whereby no result can be negative), then the subtraction has the effect of tending to bunch together the lowest weighted members in the queue. Note that if saturated subtraction is used in step 268, then it is not necessary to carry out steps 261-263 or 267 because negative results will not be produced by step 268. Moreover, if the amount subtracted in step 268 is equal to or less than the prior effective weight of the winner (where prior means here, before addition step 267), then no negative results will be produced by step 268 because the prior effective weight of the winner is a measure of the distance between the bottom of the whole group of effective weights and the zero bar (i.e. bar 214a). Accordingly, if either subtraction with zero saturation is carried out in step 268 or subtraction by a positive amount equal to or less than the prior effective weight of the winner is carried out in step 268, then bypass paths 264 and 269 may be effectuated, thereby shorting out steps 261, 262, 263 and 267 from the loop.

On the other hand, if step 268 does not have zero saturation and it allows for subtraction by a whole-group shifting amount greater than the prior effective weight of the winner, then step 268 can generate negative results. If a negative result is generated (or another form of below bar result is generated), then after loop back path 270 is taken, step 261 will determine that at least one of the current effective weights is below the reference zero bar (i.e., below zero) and it will switch the loop into the individual pushback mode. As a result, while the individual pushback mode is in effect, only the winner (which also happens to have been the lowest valued member in the residuals group) will be pushed back to a higher value. Eventually all below-the-bar values will have been pushed back above the reference bar (i.e., above zero) and then the system will again switch into the whole-group advance mode. By this means, steps 261-263 and 267-268 keep the group of effective weight values hovering around or slightly above the reference bar (i.e., the zero bar) while at the same time step 266 is shuffling winners back in their relative position within the queue in accordance with their initial weights. This is just an illustration of a possible queue shuffling approach. Other queue shuffling approaches may be used instead as may be appropriate in different circumstances.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example of a further modification in accordance with the disclosure, instead of having effective weights moving as one whole group uni-directionally towards a winner's bar (i.e. the zero bar) per arrow symbol 214b of FIG. 2A, one can have two groups moving towards a middle reference bar that also functions as the winner's bar, where the groups approach from opposite directions along the numbers line. More specifically, in one embodiment all negative residuals get a same positive shift value added to them in each arbitration round and all currently positive residuals get a same positive shift value added to them where the shift amounts are selected to not cause any group members to cross past the winner's bar. At the same time the winner is picked as the residual whose absolute value is closest to the winner's bar (i.e., closest to zero, and in the case of a tie the winner is the one whose port or source buffer is the lowest numbered one). That selected winner is shifted away from the winner's bar by making it more negative if its prior effective weight was negative and by making it more positive if its prior effective weight was positive, where the amount of push-away from the winner's bar is equal to or corresponds to the initial weight of the winner.

By way of yet a further example, it is understood that the configuring of a network device (e.g., 102 of FIG. 1A, or Device#1 of FIG. 3) in accordance with the disclosure can include use of an external computer (e.g., root host 301) for determining what weight generating function (i.e. 216) will be used by each table remapper and what shuffling algorithm will be used by each selection engine as well as determining the depths of the respective public scheduling tables. In one variation, the root host (e.g. 301) may selectively command certain network devices to use only their public scheduling tables and only the protocol-defined stepper algorithm (120) rather than allowing those commanded devices to use their private tables instead. A computer-readable medium or another form of machine-instructing means (including but not limited to downloading of manufactured instructing signals over a network (e.g., 111-11N)) may be used for instructing an instructable machine to carry out remapping functions and/or selection-from-private table functions in accordance with the disclosure.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A data processing device capable of servicing plural data streams and comprising:
   (a) a first scheduling table for storing first scheduling variables defining relative frequencies at which competing data streams are to be serviced by a data servicing resource, the first scheduling table having a predefined first data structure;
   (b) a second scheduling table for storing second scheduling variables that are derived from the first scheduling variables, said second scheduling table having a second data structure that is substantially different from the predefined first data structure; and
   (c) a selection engine that is responsive to the second scheduling variables instead of the first scheduling variables, thereby substituting the second scheduling variables for the first scheduling variables, and that operates to offer service opportunities to plural data stream sources in a manner which at least roughly mimics a service-offering schedule defined by the first scheduling variables of the first scheduling table.

2. The data processing device of claim 1 wherein:
   (a.1) said first scheduling table defines a plurality of phases and uses corresponding ones of said first scheduling variables as identifiers to identify respective ones of the competing data streams as ones that is to be first offered service by the data servicing resource in each given phase.

3. The data processing device of claim 2 wherein:
   (a.2) said first scheduling table has more than 32 active phases.

4. The data processing device of claim 1 wherein:
   (a.1) said data servicing resource includes a serial data outputting means.

5. The data processing device of claim 4 wherein:
   (a.2) said serial data outputting means is configurable to output serial data onto a PCI-Express serial link.

6. The data processing device of claim 1 wherein:
   (a.1) said data servicing resource is reconfigurable to have different data servicing bandwidths.

7. The data processing device of claim 1 wherein:
   (b.1) said second scheduling table is structured to define a plurality of said second scheduling variables as initial weights corresponding to corresponding ones of said competing data streams; and
   (b.2) said second scheduling table further stores third scheduling variables whose values are functions of corresponding ones of the second scheduling variables.

8. The data processing device of claim 7 wherein:
   (b.3) said second scheduling table is structured to define a plurality of fourth scheduling variables corresponding to the competing data streams and indicating at least if a corresponding source buffer of a given stream is empty.

9. The data processing device of claim 7 wherein:
   (b.3) said second scheduling table is structured to define a plurality of fourth scheduling variables corresponding to the competing data streams and indicating truthfulness of the condition: that a corresponding source buffer of a given stream is empty OR a corresponding destination buffer of the data servicing resource is full.

10. The data processing device of claim 7 wherein:
    (b.3) said second scheduling table is structured to define a plurality of fourth scheduling variables corresponding to the competing data streams and defining temporary shifting values that are derived from the initial weights and are to be used for producing next values for the third scheduling variables.

11. The data processing device of claim 7 wherein:
    (c.1) said selection engine treats the third scheduling variables as effective weights of corresponding ones of the competing data streams where those of the competing data streams that have relatively lower effective weights are given priority for access to the data servicing resource over those of the competing data streams that have relatively higher effective weights.

12. The data processing device of claim 11 wherein:
    (c.2) said selection engine increases the effective weight of a given data stream after having granted data of the given data stream access to the data servicing resource.

13. The data processing device of claim 12 wherein:
    (c.3) said increasing of the effective weight is a function of the initial weight of the given data stream that was granted said access.

14. The data processing device of claim 7 wherein:
    (c.1) said selection engine includes means for keeping values of the third scheduling variables hovering at or above or around a predefined reference value.

15. The data processing device of claim 1 and further comprising:
    (d) a mapper for generating said second scheduling variables from said first scheduling variables.

16. The data processing device of claim 15 wherein:
    (d.1) the mapper initially generates signals defining the second scheduling variables as functions of the reciprocals of the relative frequencies at which the respective competing data streams are to be serviced by the data servicing resource in accordance with said first scheduling variables.

17. The data processing device of claim 15 wherein:
    (d.1) the mapper detects changes to individual ones of the first scheduling variables in said first scheduling table and in response to a detected change, changes two corresponding ones of the second scheduling variables in said second scheduling table.

18. The data processing device of claim 15 wherein: the first scheduling table is characterized as being relatively publicly accessible to devices external of said data processing device; and the second scheduling table is characterized as being relatively more private and thus not accessible to one or more of said external devices.

19. A method implemented by at least one manufactured device for selectively dispatching data from plural sources for processing by a shared resource, the method comprising:
    (a) maintaining a first dispatch scheduling table that is publicly accessible to at least a predefined group of schedule managers and/or overseer devices;
    (b) maintaining a second dispatch scheduling table that is not publicly accessible to at least one member of said predefined group of schedule managers and/or overseer devices, where the second dispatch scheduling table has a substantially different data structure than that of the first dispatch scheduling table; and (c) using the second dispatch scheduling table instead of the first dispatch scheduling table to automatically select data from respective ones of the plural sources for successive processing by the shared resource, thereby substituting the second dispatch scheduling table for the first dispatch scheduling table, wherein said using of the second dispatch scheduling table is such as to create an appearance of approximate adherence to a dispatch schedule defined by the first dispatch scheduling table.

20. The method of claim 19 wherein:
(a.1) said first dispatch scheduling table defines a plurality of phases and stores a corresponding set of first scheduling variables as identifiers that identify respective ones of the data sources as ones that are to be first offered service by the shared resource in each given phase.

21. The method of claim 20 wherein:
(a.2) said first dispatch scheduling table has more than 32 active phases.

22. The method of claim 19 wherein: said shared resource includes a serial data outputting means.

23. The method of claim 22 wherein: said serial data outputting means is configurable to output serial data onto a PCI-Express serial link.

24. The method of claim 19 wherein:
(a.1) said predefined group of schedule managers and/or overseer devices includes a first network traffic manager for a first network complex.

25. The method of claim 24 wherein:
(a.2) said predefined group of schedule managers and/or overseer devices includes a second network traffic manager for a second network complex that is operatively coupled to the first network complex.

26. The method of claim 19 wherein: said shared resource is reconfigurable to have different data servicing bandwidths.

27. The method of claim 19 wherein:
(a.1) said first dispatch scheduling table stores a set of first scheduling variables as identifiers that identify respective ones of the data sources as ones that are to be first offered service by the shared resource in each of successive servicing phases;
(b.1) said second dispatch scheduling table is structured to store a plurality of second scheduling variables as defining initial weights assigned to corresponding ones of said competing data sources; and
(b.2) said second dispatch scheduling table is structured to further store a plurality of third scheduling variables whose values are functions of corresponding ones of the second scheduling variables.

28. The method of claim 27 and further comprising:
(d) using a parallel processing method to determine if corresponding ones of the sources that are competing for access to the shared resource have data to submit or not.

29. The method of claim 28 and further comprising:
(e) using a parallel processing method to determine if corresponding data destinations of said competing ones of the sources have capacity to receive data that can be potentially submitted from the corresponding ones of the competing sources.

30. The method of claim 27 and wherein said step of using includes:
(c.1) treating the third scheduling variables as effective weights of corresponding ones of the competing data sources where those of the competing data sources that have relatively lower effective weights are given priority for access to the shared resource over those of the competing data sources that have relatively higher effective weights.

31. The method of claim 30 and wherein said step of using further includes:
(c.2) increasing the effective weight of a given data source after having granted the given data source access to the shared resource.

32. The method of claim 31 and wherein:
(c.3) said increasing of the effective weight is a function of the initial weight of the given data source that was granted said access.

33. The method of claim 30 and wherein said step of using further includes:
(c.2) keeping values of the third scheduling variables hovering at or above or around a predefined reference value.

34. The method of claim 19 and further comprising:
(d) modifying the second dispatch scheduling table in response to changes made to the first dispatch scheduling table.

35. The method of claim 34 wherein said step of modifying includes:
(d.1) detecting changes to individual ones of first scheduling variables in said first dispatch scheduling table and in response to a detected change, changing at least two corresponding ones of second scheduling variables stored in said second dispatch scheduling table.

36. A method implemented by at least one manufactured device of controlling selective dispatching of data from plural sources to a shared resource, the method comprising:
(a) maintaining a first dispatch scheduling table that is publicly accessible to at least a predefined group of schedule managers and/or overseer devices;
(b) maintaining a second dispatch scheduling table that is not publicly accessible to at least one member of said predefined group of schedule managers and/or overseer devices, where the second dispatch scheduling table has a substantially different data structure than that of the first dispatch scheduling table;
(c) using the second dispatch scheduling table instead of the first dispatch scheduling table to automatically select data from respective ones of the plural sources for successive processing by the shared resource, thereby substituting the second dispatch scheduling table for the first dispatch scheduling table, wherein said using of the second dispatch scheduling table is such as to normally create an appearance of approximate adherence to a dispatch schedule defined by the first dispatch scheduling table; and
(d) temporarily making modifications to the second dispatch scheduling table without making corresponding changes to the first dispatch scheduling table.

37. An apparatus comprising:
(a) re-mapping means for remapping a publicly-maintained, first scheduling table that has a first data structure to thereby generate a corresponding and privately-maintained, second scheduling table that has a different second data structure, where the first and second scheduling tables are used for controlling traffic flow in a network and where a selection engine is responsive to the second scheduling table instead of the first scheduling table, thereby substituting the second scheduling table for the first scheduling table; and
(b) a history-weighted, service offering means for opportunistically offering dispatch opportunities to traffic from different data sources of a local network device based on initial weights assigned to the data sources and based on prior service offerings made to those data sources.

38. The apparatus of claim 37 and further comprising:
(c) a local service adjuster operatively coupled to the network and to the first scheduling table for modifying the first scheduling table in response to backpressure or slack advisements received from the network.

39. The apparatus of claim 37 wherein:
(c.1) said local service adjuster is further operatively coupled to the second scheduling table for modifying the second scheduling table in response to backpressure or slack advisements received from the network.

40. The apparatus of claim 38 and further comprising:
(d) a plurality of local selection engines each dedicated to a respective one of plural and shared processing resources of the local device and each local selection engine being logically associated with a corresponding second scheduling table among plural ones of such second scheduling tables, each local selection engine modifying its corresponding second scheduling table after having granted one of the different data sources access to its respective one of the shared processing resources.

41. A manufactured system having (a) plural public scheduling tables for controlling traffic flow in the networked system, (b) plural private scheduling tables for controlling traffic flow in the networked system, (c) plural re-mapping engines for converting scheduling data stored in the public scheduling tables into corresponding scheduling data to be stored in corresponding ones of the private scheduling tables, wherein a selection engine uses the plural private scheduling tables instead of the plural public scheduling tables, thereby substituting the plural private scheduling tables for the plural public scheduling tables.

42. A system having (a) plural public scheduling tables for controlling traffic flow in the networked system, (b) plural private scheduling tables for controlling traffic flow in the networked system, (c) plural re-mapping engines for converting scheduling data stored in the public scheduling tables into corresponding scheduling data to be stored in corresponding ones of the private scheduling tables, (d) plural selection engines interacting with corresponding ones of the private scheduling tables instead of the plural public scheduling tables, thereby substituting the plural private scheduling tables for the plural public scheduling tables, and (e) computer-readable memory storing computer-executable instructions directed to a prespecified and instructable selection engine for defining an interactive function to be carried out by the instructable selection engine on its corresponding private scheduling table instead of its corresponding public scheduling table.

* * * * *